Oct. 22, 1929.  A. T. KASLEY  1,732,813
FLUID PRESSURE GOVERNOR
Original Filed Dec. 16, 1926  2 Sheets-Sheet 1

WITNESSES:
E. Lutz.

A. T. Kasley
INVENTOR

BY A. B. Reavis
ATTORNEY

Patented Oct. 22, 1929

1,732,813

UNITED STATES PATENT OFFICE

ALEXANDER T. KASLEY, OF MOORES, PENNSYLVANIA, ASSIGNOR TO WESTINGHOUSE ELECTRIC & MANUFACTURING COMPANY, A CORPORATION OF PENNSYLVANIA

FLUID-PRESSURE GOVERNOR

Application filed December 16, 1926, Serial No. 155,264. Renewed April 18, 1929.

My invention relates to pressure-operated speed governors and has for an object to provide apparatus of the character designated which shall be of simple construction, reliable in operation and sensitive to varying load conditions.

More particularly, my invention has for its object to provide a spring loaded pressure-responsive element in a governing mechanism with a constant fluid-pressure load in addition to the spring, whereby a lighter spring may be employed, giving a greater range of movement to the pressure-responsive element for a given variation in pressure.

Another object of my invention is to provide apparatus of the character designated with means for adjusting the constant fluid-pressure load on the pressure-responsive element and thus to regulate the speed of the apparatus or machine being governed.

Figure 1:
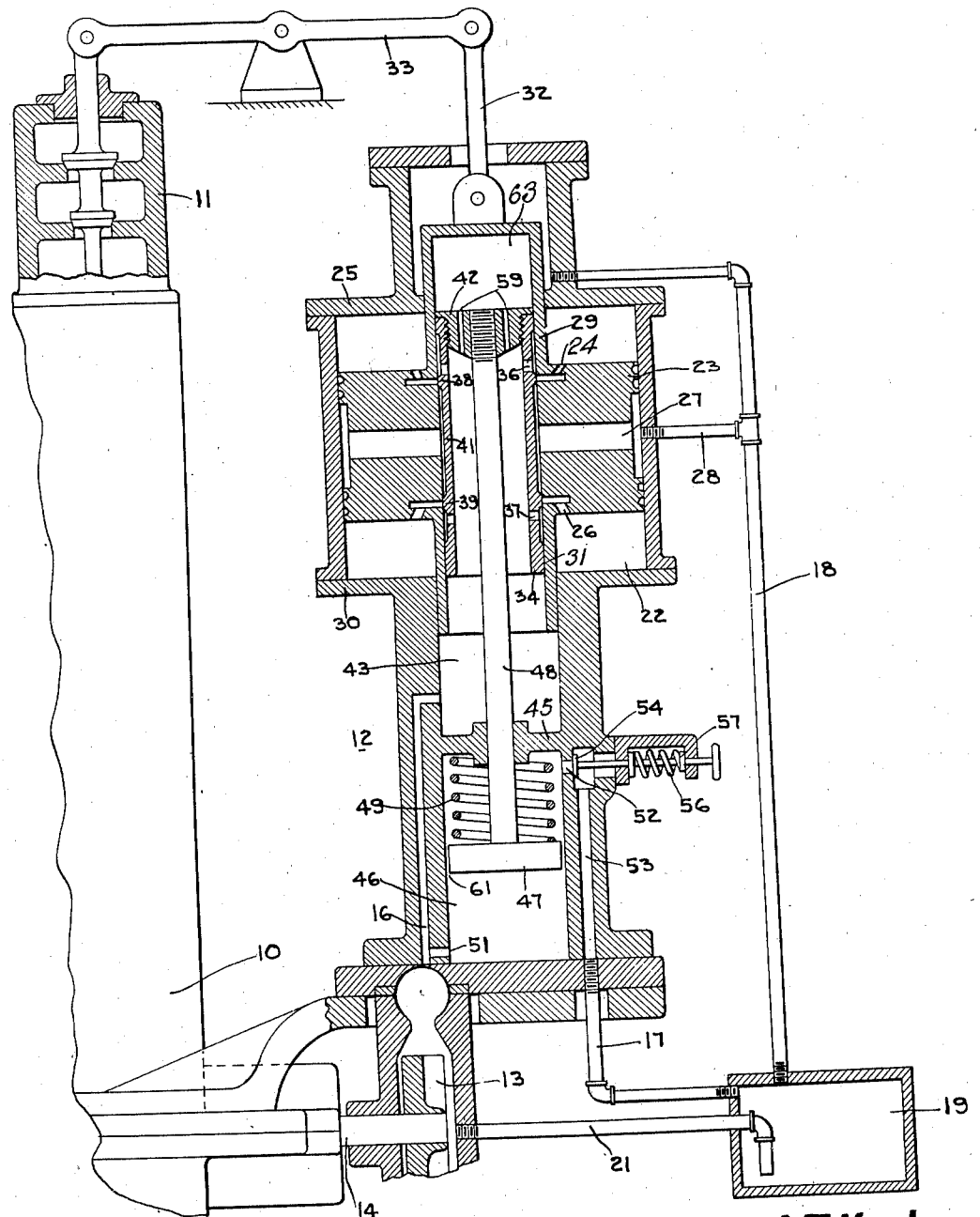
Figure 2:
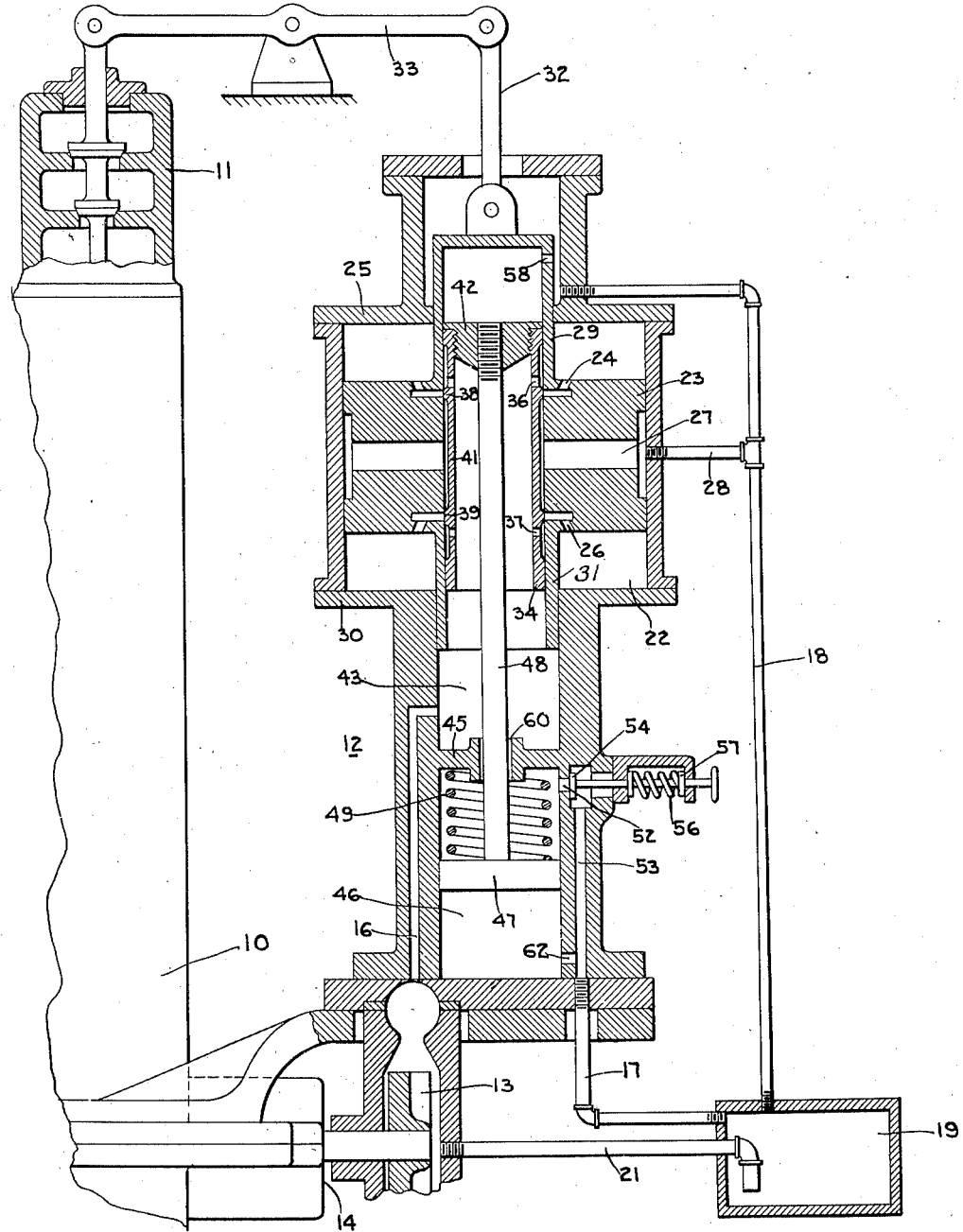

Apparatus made in accordance with my invention is illustrated in the accompanying drawings, in which:

Fig. 1 is a sectional view of one form of governor, the admission valve and its connection with the governor also being shown; and, Fig. 2 is a similar view of a modified form of governor.

This application is a continuation in part of subject matter divided from my application Serial No. 718,984, filed June 9, 1924, and assigned to the Westinghouse Elec. & Mfg. Company.

As is well-known in the art, difficulties have been encountered in the design of pressure-operated speed governors in providing a spring for acting against the pressure-responsive element in opposition to the variable governing pressure that would permit a sufficient range of movement for a given variation in pressure and at the same time be of sufficient strength to withstand the relatively high fluid-pressure necessary to operate the governing mechanism. The use of a single spring without any other compensating element to oppose the force of the fluid pressure has been found to be impractical due to its inordinate length.

In the patent of Henry F. Schmidt, Patent No. 1,533,766, granted April 14, 1925, for an improvement in governors, and assigned to the Westinghouse Electric & Manufacturing Company, there is illustrated and described a governor having a pressure-responsive element loaded with two springs, one being a relatively heavy spring of the floating type under substantially constant tension for a given adjustment and moving with the pressure-responsive element to its different positions, the other spring being relatively light and having one end fixed, constituting a scale spring for the pressure-responsive element, permitting a wider range of movement for a given variation in pressure.

My invention is particularly applicable to such a governor as is described in the application aforesaid and provides a simpler apparatus for obtaining a wide range of movement of the pressure-responsive element for a given variation in pressure. In accordance with my invention, the pressure-responsive element is loaded with a single spring to compensate for variations in pressure and in addition thereto, a constant fluid-pressure load is imposed thereon. By this means the spring employed may be of any scale to give the desired deflection for a given variation in pressure. I also provide means for regulating the fluid-pressure load imposed whereby the speed of the apparatus governed may be regulated.

Referring now to the drawings for a better understanding of my invention, I show in Fig. 1 an elastic-fluid turbine 10, which is provided with an inlet valve 11, said inlet valve being operated by my improved governing apparatus at 12.

The governing apparatus 12 acts in response to the pressure of fluid developed by a pump 13 or other suitable means driven by a shaft 14 of the turbine 10. Fluid is supplied by the pump 13 to the motor device 12 by means of a conduit 16, shown in Fig. 1, and fluid which is exhausted or leaks off from the governor is returned by conduits 17 and 18, which communicate with a storage receptacle 19, which is, in turn, connected by a conduit 21 with the inlet to the pump 14.

The governor 12 comprises a cylinder 22 within which is disposed a hollow operating piston 23. The piston 23 is provided with ports 24 and 26 leading from the interior thereof to its upper and lower faces, respectively. Between the ports 24 and 26 an exhaust port 27 leads from the interior of the piston 23 and is in all positions of the piston in communication with a branch 28 of the conduit 18. The piston 23 is provided at its upper and lower ends with stem portions 29 and 31 which extend through covers 25 and 30 of the cylinder 22 and form a fluid-tight joint therewith. The upper end of stem portion 29 is closed and attached thereto is a rod 32 for actuating the admission valve 11 through a lever 33. An upward movement of the piston 23 moves the admission valve 11 in a closing direction, while a downward movement of the piston 23 moves the admission valve 11 in an opening direction.

Disposed within the hollow operating piston 23 and controlling its movements is a hollow pilot valve 34. The pilot valve 34 is provided with ports 36 and 37 adapted to admit fluid under pressure to the ports 24 or 26 of the operating piston 23 upon movement of the pilot valve. When the turbine is runing at a constant speed the ports 24 and 26 are covered by means of two annular shoulders 38 and 39 on the pilot valve 34. Between the annular shoulders 38 and 39 of the pilot valve 34 is a reduced portion 41, which is in communication at all times with the exhaust port 27. The lower end of the pilot valve 34 is open to permit fluid under pressure to pass to the interior thereof, while the upper end is provided with a cap 42, which has openings 59 therethrough for the purpose of equalizing the pressure on opposite sides thereof. The stem portion 31 of the piston 23 extends downward through the cylinder cover 30 into a chamber 43 which serves as a pressure chamber for the pilot valve 34. In operation, fluid under pressure developed by the pump 13 is delivered to the chamber 43 and is therefore always present within the hollow of the pilot valve 34.

Upon an upward movement of the pilot valve 34, fluid under pressure passes through the ports 37 and 26 to the under side of the piston 23, forcing it upwardly. The piston 34 moves upwardly until the port 26 is again covered by the shoulder 39 of the pilot valve 34. Upon a downward movement of the pilot valve 34, fluid under pressure is admitted through the ports 36 and 24 to the upper side of the piston 23 forcing it downwardly until the ports 24 are again covered. During its downward movement, fluid beneath the piston 23 passes through the port 26 around the reduced portion 41 of the valve 34 and thence to the exhaust through the port 27. During upward movement, fluid above the piston 23 passes through the port 24 around the reduced portion 41 and through the port 27 to the exhaust.

To control movement of the pilot valve 34, I have provided a cylinder 46 disposed beneath the chamber 43 and separated therefrom by a partition 45. A piston 47 operates within the cylinder 46 and is connected by a rod 48 extending through the partition 45 to a cap 42 of the valve 34. The piston 47 is biased in a downward direction by a spring 49. Fluid under pressure is admitted to the lower end of the cylinder 46 through an inlet 51 leading from the conduit 16 and acts in an upward direction against the piston 47. The piston 47 is arranged to permit a restricted flow of fluid thereby. To this end I show the piston as being loose fitting within the cylinder 46, as indicated at 61, though it should be understood that any suitable means may be employed to provide a restricted flow thereby.

At the upper end of the cylinder 46 is an outlet 52, through which fluid flowing by the piston 47 is permitted to pass to a conduit 53 leading to the fluid reservoir 19. Controlling the flow of fluid through the outlet 52 is a valve 54. The valve 54 is weighted or biased, as by a spring 56, having an adjustable abutment 57. By this means, the fluid in the cylinder 46, above the piston 47, in passing through the outlet 52 has pressure imposed thereupon offsetting a certain part of the pressure acting to force the piston 47 in an upward direction. The piston 47, therefore, is actuated in an upward direction by the variable fluid pressure developed by the pump 13 and in a downward direction by the spring 49 aided by the constant pressure imposed upon the fluid within the cylinder above the piston 47. It will be apparent that any suitable pressure may be imposed upon the fluid above the piston 47 and that a spring 49 may be thereby selected to give the desired range of movement for a given variation in pressure.

The operation of the apparatus so far described is as follows: Fluid under pressure is developed by the pump 13, driven by the shaft 14, of the turbine 10. As the speed of the turbine varies, a pressure varying as a function of the speed is developed. This fluid under variable pressure is conveyed to the cylinder 46 beneath the loose-fitting piston 47, to the chamber 43 and to the interior of the pilot valve 34. The loose-fitting piston 47 permits a continuous restricted flow of fluid thereby which passes to the outlet 52 in the upper end of the cylinder 46. The loaded valve 54 controls the flow and, for a given valve loading, imposes a constant pressure upon the fluid passing through the outlet and thus offsets a part of the variable pressure acting to force the piston 47 in an upward direction. The spring 49 exerts a force proportional to its deflection in opposition to the variable pressure beneath the piston 47. The movement of pilot valve 34 is not directly affected by the pressure in chamber 43 inasmuch as this pressure is communicated through openings 59 to the chamber 63 and imposed on the upper side of cap 42.

If the turbine is operating at a normal speed the parts assume the position shown in Fig. 1. Upon an increase in speed and a consequent increased pressure beneath the piston 47, the piston 47 and pilot valve 34 move upwardly, further compressing the spring 49 to compensate for the increased force exerted by the pressure of the fluid. As the loaded valve 54 maintains a constant pressure above the piston 47, the upward movement thereof is opposed both by the spring 49 and by the constant fluid pressure above it. Upward movement of the pilot valve 34 is followed by an upward movement of the piston 23 and a movement of the admission valve 11 in a closing direction as already described.

Upon a decrease in speed of the turbine and a consequent decrease in pressure developed by the pump 13, the spring 49 aided by the offsetting effect of fluid pressure above the piston 47, forces it and the pilot valve 34 in a downward direction, followed by the piston 23, which movement opens the admission valve 11 wider.

To regulate the speed of the turbine, the adjustable abutment 57 of the spring 56 is moved to increase or decrease the pressure exerted by the spring and consequently to increase or decrease the pressure imposed upon the fluid above the piston 47. By increasing this pressure, a higher speed and higher variable pressure is required to operate the governor mechanism. By reducing the pressure above the piston 47 a lower speed and a lesser variable pressure is required to operate the governor mechanism to close the admission valve 11.

Fig. 2 shows another embodiment of my invention. It will be noted that in Fig. 1 the variable impeller pressure is imposed on the under side of the piston 47 and exerts a force thereon in an upward direction. In Fig. 2, this pressure is applied to the under side of pilot valve 34 instead of to the under side of piston 47. Since the valve 34 and piston 47 are rigidly connected by rod 48, the effect of the fluid pressure will be the same.

The cap 42 in this case is imperforate so that the pilot valve is subjected to the pressure in chamber 43. An opening 58 is provided near the top of stem portion 29 for the purpose of providing atmospheric pressure on the upper side of the cap 42 and also for the purpose of draining leakage by the cap 42. The opening 51 of Fig. 1 is omitted and the pressure above piston 47 is obtained by providing a clearance between rod 48 and partition 45 as indicated at 60. An opening 62 is provided near the bottom of chamber 46 for draining fluid which leaks by the piston 47 and for the purpose of maintaining atmospheric pressure on the lower side of piston 47.

It will be apparent that the operation of this embodiment is similar to that of the embodiment shown in Fig. 1, the only difference being that the variable impeller pressure is applied to the pilot valve 34 instead of to the piston 47. The constant pressure above piston 47 acts in exactly the same way.

From the foregoing, it will be apparent that I have invented a fluid-pressure governor wherein the pressure-responsive element is opposed by a spring and by a predetermined constant fluid pressure, whereby a spring of lighter scale may be employed, and the pressure-responsive element has a wider range of movement for a given variation in pressure.

While I have shown my invention in two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a fluid pressure operated governing mechanism, an admission valve, a stationary casing providing a chamber therein, a piston reciprocating in said chamber, a rod secured to said piston and extending through a wall of the chamber and operatively associated with the admission valve, means for developing variable fluid pressure and for subjecting one side of said piston to said pressure, variable bias means exerting a force on said piston in opposition to the variable fluid pressure, means permitting a restricted flow of fluid by the piston, and means for regulating the escape of fluid flowing by the piston and imposing a pressure thereon, which pressure is exerted on the piston in opposition to the variable fluid pressure.

2. In a fluid pressure operated governing mechanism, an admission valve, a stationary casing providing a chamber therein, a piston reciprocating in said chamber, a rod secured to said piston and extending through a wall of the chamber and operatively associated with the admission valve, means for subjecting one side of said piston to variable fluid pressure, a spring exerting a force on said piston in opposition to the variable fluid pressure, means permitting a restricted flow of fluid by the piston, and means for regulating the escape of fluid flowing by the piston and imposing a pressure thereon, which pressure is exerted on the piston in opposition to the variable fluid pressure.

3. In a governing mechanism, the combination of a piston operated by fluid under pressure, a pilot valve controlling the operations of said piston and connected to a second piston actuated in one direction by variable fluid pressure, resilient means associated with the second piston and opposing the variable fluid pressure and means associated with the resilient means for imposing a fluid pressure on the second piston in oppostion to the variable fluid pressure.

4. In a fluid-pressure actuated governor for an elastic fluid motor having an admission valve, the combination of means for developing fluid pressure varying as a function of the speed of the elastic fluid motor, a cylinder having an operating piston disposed therein actuated by fluid pressure for controlling the admission valve, a valve controlling the operation of said piston, a second piston connected to the valve and actuated in one direction by the variable fluid pressure and biased in the opposite direction by a spring, means permitting a restricted flow of fluid by the second piston to an outlet, and means controlling the flow of fluid through said outlet and thereby imposing a pressure on the fluid flowing by the second piston, which pressure is exerted on the second piston in opposition to the variable fluid pressure.

5. In a fluid pressure governor, an operating piston, a pilot valve therefor, a second piston connected to the pilot valve and subjected to variable fluid pressure on one side, means for imposing a constant fluid pressure on the opposite side of the second piston, and a spring exerting a force on said opposite side of the second piston.

6. In a governing mechanism, the combination of a piston operated by fluid pressure, a pressure-responsive element including a second piston and a valve controlling the operations of the first-mentioned piston, the pressure-responsive element being actuated in one direction by variable fluid pressure resilient means associated with the pressure-responsive element and opposing the variable fluid pressure, and means for imposing a fluid pressure on the second piston in opposition to the variable fluid pressure.

7. In a governing mechanism, the combination of a piston operated by fluid pressure, a pressure-responsive element including a second piston and a valve controlling the operations of the first-mentioned piston, the pressure-responsive element being actuated in one direction by variable fluid pressure, resilient means exerting a force on the second piston in opposition to the variable fluid pressure, and means for imposing a fluid pressure on the pressure-responsive element in opposition to the variable fluid pressure.

In testimony whereof, I have hereunto subscribed my name this fifteenth day of December, 1926.

ALEXANDER T. KASLEY.